P. FLYNN.
ATTACHMENT FOR PLOWS.
APPLICATION FILED JUNE 8, 1909.
938,839.  Patented Nov. 2, 1909.
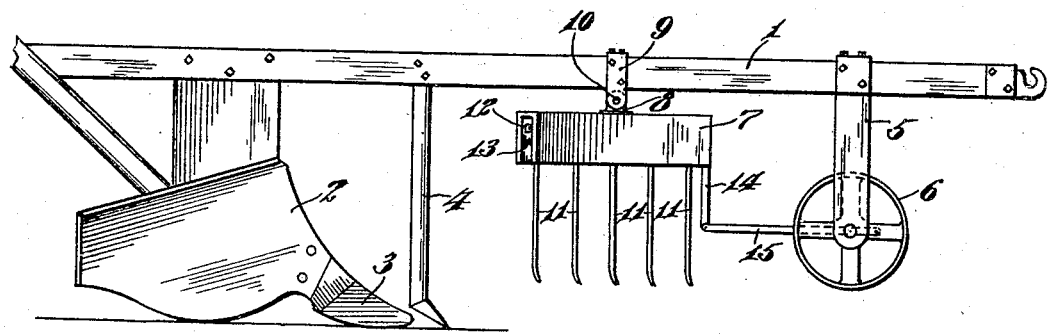
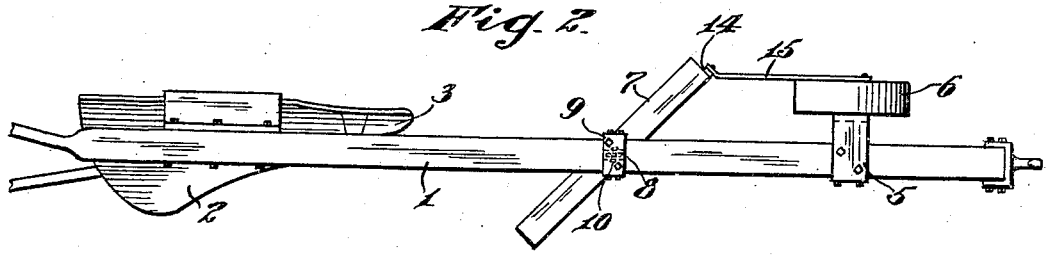
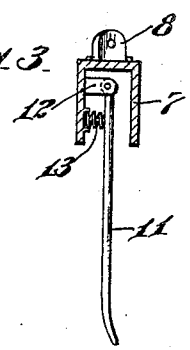
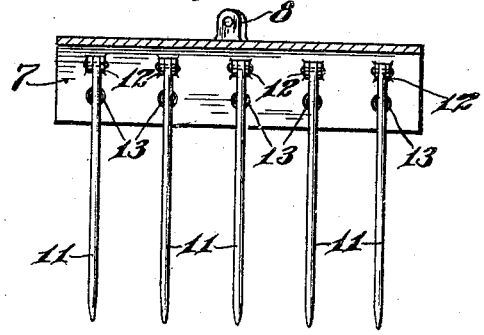
Witnesses
Theo. Rremann.
J. T. F. Mulhall.
Inventor
Patrick Flynn,
By Joshua R. H. Potts
Attorney

UNITED STATES PATENT OFFICE.

PATRICK FLYNN, OF PHILADELPHIA, PENNSYLVANIA.

ATTACHMENT FOR PLOWS.

938,839.   Specification of Letters Patent.   Patented Nov. 2, 1909.

Application filed June 8, 1909. Serial No. 500,840.

*To all whom it may concern:*

Be it known that I, PATRICK FLYNN, a citizen of the United States, residing at Philadelphia, in the county of Philadelphia and State of Pennsylvania, have invented certain new and useful Improvements in Attachments for Plows, of which the following is a specification.

My invention relates to an improved attachment for plows, the object of the invention being to provide an improved attachment which will be located in front of the plow point and moldboard, and which comprises a series of teeth forming in effect a rake, which is continuously oscillated to scrape fertilizer and other surface matter to one side, preventing its accumulation on the plow, and moving it to a position where the moldboard will turn the furrow over this matter, which is moved to one side, thus insuring its burial in the earth where it will do the most good.

A further object is to provide an improved attachment of this kind, which may be inexpensively manufactured, which may be attached to any ordinary plow, and which will be so constructed as to prevent injury to any of the teeth due to contact with a stone, or other immovable object.

With these and other objects in view, the invention consists in certain novel features of construction, and combinations and arrangements of parts as will be more fully hereinafter described and pointed out in the claims.

In the accompanying drawings, Figure 1, is a side elevation illustrating my improvements. Fig. 2, is a plan view. Fig. 3, is a view in cross section through the attachment, and Fig. 4, is a view in longitudinal section of the same.

1 represents the beam of an ordinary plow to which the ordinary moldboard 2 and plow point 3 are connected, and 4 is the sod cutter in advance of the plow faces.

5 represents a bracket secured to beam 1, and affording rotary mounting for the wheel 6.

My improved attachment comprises a channel bar 7 having a perforated ear 8 at its center on its upper face, said ear 8 being disposed at an angle to the channel bar, whereby the latter will be positioned at an angle relative to the beam as shown most clearly in Fig. 2. This perforated ear 8 is located in a bifurcated bracket 9 secured to beam 1, and pivotally supported by a pin 10 located in alined openings in the bracket 9 and ear 8.

11 represents teeth, which are pivotally secured at their upper end in bifurcated brackets 12 in channel bar 7, and coiled springs 13 are located between the pins and the rear wall of the channel 7, holding the teeth in normal position, but permitting independent rearward movement of a tooth when it strikes a stone or other immovable obstruction, so as to permit the tooth to ride over the obstruction and not be damaged by the contact.

A depending arm 14 is fixed to one end of the channel 7, and is pivotally connected by a pitman 15 with the wheel 6, whereby the latter will act as an eccentric to oscillate the attachment, and due to the angle of inclination of the attachment, it will scrape fertilizer and other surface accumulation to one side preventing its accumulation on the plow faces, and position it where the earth turned by the plow will bury it, and compel it to do its most effectual work.

A great many slight changes might be made in the general form and arrangements of parts described without departing from my invention, and hence I do not restrict myself to the precise details set forth, but consider myself at liberty to make such changes and alterations as fairly fall within the spirit and scope of the claims.

Having thus described my invention what I claim as new and desire to secure by Letters Patent is:

1. In combination with a plow having a beam, a bar pivotally supported between its ends on the beam of the plow, teeth connected to said vertical bar, and means for continuously oscillating said bar and teeth.

2. In combination with a plow having a beam, a bracket secured to the beam, a horizontal bar pivotally secured between its ends to the bracket, teeth connected to said bar, springs holding said teeth in normal position, and means for oscillating said bar and teeth.

3. In combination with a plow having a beam, a bracket secured to the beam, a horizontal channel bar pivotally secured between its ends to said bracket, teeth pivotally secured at their upper ends in said channel bar, springs between said teeth and rear wall of said channel bar, and means for oscillating said bar and teeth.

4. In combination with a plow having a beam, a wheel supporting the forward end of said beam, a bracket on the beam, a horizontal bar pivotally supported between its ends on said bracket, teeth depending from said bar, an arm depending from said bar, and a pitman connecting said arm eccentrically with said wheel.

5. In combination with a plow having a beam, a depending bracket on the beam, a wheel having rotary mounting in said bracket, and supporting the forward end of said beam, a bifurcated bracket secured to the beam in rear of the first mentioned bracket, a horizontal channel bar disposed at an angle to the beam, and pivotally secured between its ends to said bifurcated bracket, teeth pivotally mounted at their upper ends in said channel bar, springs normally holding said teeth in their forward position, a depending arm on one end of said channel bar, and a pitman connecting said arm eccentrically with said wheel.

6. In combination with a plow, having a beam, a bar pivotally supported on the beam, and projecting laterally therefrom, a series of teeth on said bar, a wheel supporting the forward end of the beam, and means so connecting said wheel and bar, as to continuously oscillate said bar and teeth as the wheel moves over the ground.

7. In combination with a plow, having a beam, a bar pivotally supported between its ends on the beam, and projecting at an acute angle to the beam, teeth carried by said bar, and means for continuously oscillating said bar and teeth as the plow moves over the ground.

In testimony whereof I have signed my name to this specification in the presence of two subscribing witnesses.

PATRICK FLYNN.

Witnesses:
R. H. KRENKEL,
J. A. L. MULHALL.